United States Patent [19]
Whitlock

[11] Patent Number: 4,786,387
[45] Date of Patent: Nov. 22, 1988

[54] SINGLE PHASE ENRICHMENT OF SUPER CRITICAL FLUIDS

[76] Inventor: David R. Whitlock, 16E Beacon Village, Burlington, Mass. 01803

[21] Appl. No.: 911,503

[22] Filed: Sep. 25, 1986

[51] Int. Cl.$^4$ .................. B03C 9/02; B03C 1/00; B01D 35/06; B01D 17/06
[52] U.S. Cl. .................. 204/183.1; 204/180.1; 204/186; 204/302; 204/299 R; 55/2; 55/3; 55/100; 55/155; 210/695; 210/222
[58] Field of Search ............ 204/180.1, 181.8, 181.9, 204/183.1, 188, 186, 299 R, 302, 304, 305, 306, 307, 308; 55/2, 3, 100, 155; 210/222, 223, 695

[56] References Cited

U.S. PATENT DOCUMENTS

| | | | |
|---|---|---|---|
| 2,392,624 | 1/1946 | Tunis | 210/695 X |
| 2,573,967 | 11/1957 | Hamlin | 204/302 X |
| 2,588,111 | 3/1952 | Hanneman | 204/302 X |
| 3,162,592 | 12/1964 | Pohl | 204/186 |
| 3,304,251 | 3/1962 | Walker et al. | |
| 3,423,306 | 1/1969 | Hurwitz et al. | 204/299 R |
| 3,484,362 | 12/1969 | Van Vroonhoven | 204/302 |
| 3,770,629 | 11/1973 | Nolan | 210/695 |
| 3,891,528 | 6/1975 | Griswold | 204/302 |
| 3,980,541 | 9/1976 | Aine | 204/302 X |
| 4,157,953 | 6/1979 | Mawardi | |
| 4,298,456 | 11/1981 | Coombs et al. | |

FOREIGN PATENT DOCUMENTS 810432 7/1932 Australia .................. 204/302

OTHER PUBLICATIONS

Lin & Benguigui "High-Intensity, High-Gradient Electric Separation and Dielectric Filtration of Particulate and Granular Materials" Journal of Electrostatics, 13 (1982), pp. 257–278.

Pyzuk & Zboinski "Nonlinear Dielectric Effect Near the Critical Point of Binary Mixtures" Chemical Physics Letters, vol. 52, No. 3 (15 Dec. 1977).

Ziolo, "The Critical Exponent for Nitrobenzene-Hexane Mixtures Determined by the Nonlinear Dielectric Method" Chemical Physics Letters, vol. 64, No. 3 (15 Jul. 1979).

Smith & Van Ness "Introduction to Chemical Engineering Thermodynamics" 3rd Ed, pp. 302–309.

Prigogine and Defay "Chemical Thermodynamics" pp. 237–238.

Primary Examiner—John F. Niebling
Assistant Examiner—John S. Starsiak, Jr.
Attorney, Agent, or Firm—Wolf, Greenfield & Sacks

[57] ABSTRACT

A fluid solution maintained under near critical conditions of temperature and pressure is subjected to a non-uniform field which deflects one of the components of the solution to a greater extent than other components of the solution.

33 Claims, 4 Drawing Sheets

SINGLE PHASE ENRICHMENT OF SUPER CRITICAL FLUIDS

BACKGROUND OF THE INVENTION

This invention relates in general to the separation of fluid mixtures into their constituents; more particularly to processes and means for the enrichment and/or depletion of solute in a near critical fluid.

The use of near critical and super-critical fluids as solvents to process materials is known from e.g: U.S. Pat. No. 3,969,196 issued July 13, 1976 to Zosel. Existing processes, described in this patent, for example, use a super-critical fluid as a solvent in which a solute is dissolved at one set of conditions of temperature and pressure, and when desired precipitated out by reducing the pressure or increasing the temperature. The current state of technology in this art of Super-critical Fluid Extraction is presented in a book of that name by McHugh and Krukonis, Butterworth Publishers, 1986.

The properties of super-critical fluids can give rise to undesirable results, as when dissolved silica is precipitated out of solution in high pressure steam expanding to drive a turbine. McHugh and Krukonis describe this situation at pages 21 and 22. During production of high-pressure steam silica that is present in water is dissolved when the super-critical steam is made. The silica is transported as dissolved species to the turbines. During the pressure decrease as the steam travels (expands) through the turbine, the silica precipitates out and deposits on the turbine blades, resulting eventually in a shutdown for cleaning.

The present invention, among other things, teaches a new system for driving a turbine with high pressure steam, in which dissolved species are removed from the single-phase of the steam before it reaches the turbine.

GENERAL NATURE OF THE INVENTION

The present invention is practiced in the "near-critical" region of fluids, where the fluid medium exhibits positive non-linear polarization effects in the presence of an electric field, or a magnetic field when a magnetic or diamagnetic fluid is involved. According to the invention in its most general aspect, a near-critical fluid medium bearing a solute is subjected to a non-uniform electric field (or the magnetic equivalent when appropriate) so as to exert a motive force upon the components and thereby enrich one region of the medium in one component and deplete another region of the medium of said component. This process is carried out in a single phase fluid medium. A component is considered to be any species in a mixture, either solute or solvent, either majority or minority material. This dissolved material may be either solid, liquid or gaseous.

Dielectrophoresis is the translational motion of a neutral object caused by its response to an inhomogeneous electric field; i.e: by polarization effects in a non-uniform electric field. Dielectrophoresis is independent of the sign of field direction; it can occur in an A.C. field. The application of dielectrophoresis to separation and filtration of particulate and granular solid materials from a liquid is discussed in a paper entitled "High-Intensity, High-Gradient Electric Separation and Filtration of Particulate and Granular Materials", by I. J. Lin and L. Benquiqui, Journal of Electrostatics, 13 (1982) 257–278, Elsevier Scientific Publishing Co., Amsterdam, The Netherlands. The motive force arises from polarization of a neutral (not charged) particle, which when polarized is pulled toward the strongest field region, no matter which electrode is charged positive and which is negative. A neutral particle will not be moved by a uniform electric field. The interaction of charged particles with electric fields, uniform or not, is a direct coulombic process, different from and not to be confused with dielectrophoresis. Accordingly, fields intense enough to strip charges from particles in a liquid, due to field effects, are not useful in dielectrophoresis, which consequently exerts comparatively gentler forces on the particles.

Dielectrophoresis is not known to have been used heretofore to enrich or concentrate a solute in a single-phase fluid except where very large molecules have been involved. Since thermal effects tend to disrupt dielectrophoresis with molecular-sized particles, they can be controlled only under special conditions such as in a molecular beam. (Perry's Chemical Engineers' Handbook, 6th Ed., McGraw-Hill, 1984, pp 17–45 to 17–49). Pohl has pointed out that non-uniform field effects are easily displayed by large particles, but that control of the particles by the field effects fades as the size of the particles is decreased to the molecular level. "At this level, control by non-uniform field effects in the presence of thermal randomizing processes is to be had only in very special circumstances such as in molecular beams." Pohl, Herbert A., "Dielectrophoresis", Cambridge Univ. Press 1978, Sec. 1.2, pg. 5; sec. 7.6 and FIG. 7.5, pp. 86–89; Sec. 13.1, p. 211; Sec. 13.3.1, p. 232. The last Sec. 13.3.1 considering the dielectrophoresis of molecules in solution, indicates feasibility of work with "rather large molecules"; e.g: polymers and large biomolecules. U.S. Pat. No. 3,162,592 to Pohl discloses uses of dielectrophoresis to separate solid materials.

U.S. Pat. No. 4,390,403 to Batchelder, where it is disclosed to manipulate chemicals in a two-phase system using bubbles or slabs of material in a surrounding fluid, makes mention in passing (Col. 7, lines 35–45) of manipulation of a region of differing dielectric constant "as small as a single molecule". The required conditions are "high electric field strengths and . . . low ambient temperatures" the latter being again a reference to the effects of thermal randomizing processes. In his one example that discusses how small his bubbles can be made, their diameters are comparable to the "characteristic dimension . . . of the fluid gap and electrode spacing" (Col. 7, lines 5–6). Presumably his manipulation of single molecules requires apparatus of molecular size.

According to the present invention a solute is dissolved in a fluid which is then maintained under near-critical conditions of temperature and pressure, and a non-uniform field is applied to move the solute to a first region in the fluid which thereby becomes enriched in the solute. The invention is useful to move solutes of molecular sizes smaller than heretofore known to be feasible using dielectrophoresis, without regard to thermal randomizing process. With the present invention, separation processes of the prior art which heretofore have been limited essentially to particulate materials can be extended to utility with solutions. Thus, the present invention is applicable to true solutions, ie: homogeneous mixtures of two or more substances, the composition of which can be varied continuously within certain limits, and contains solutes that are not filterable except by filter media containing pores of molecular dimensions. Thus, a colloid or a suspension is not a solution, but for example sugar in water is.

Investigations of the non-linear dielectric effect in some binary systems near a liquid-liquid critical point have revealed an electric permittivity increase which occurs as far as 20° C. or more above the critical temperature as a result of an applied electric field. Pyzuk and Zboinski—"Non-linear Dielectric Effect Near the Critical Point of Binary Mixtures"; Chem Phys Ltrs 52 (1977) pp 577–579; J. Ziolo—"The Critical Exponent for Nitrobenzene-Hexane Mixtures Determined by the Non-Linear Dielectric Method" Chem Phys Ltrs 64 (1979) pp 570–572. A strong (apparently uniform) external electric field, described by Pyzuk and Zboinski as a "dc high electric field of approximately $10^{-3}$s duration and an intensity of up to $10^7$V per meter" was applied to a parallel plate condenser containing the medium to be examined. A measuring frequency of about 2.5 MHz was used. The effects measured were momentary increases in dielectric constant attributed to microregions of higher and lower concentrations of the two components. Ziolo mentions anisotropy in the electrical properties of microregions containing different concentrations of the two components, and observes that near the critical temperature the solution becomes inhomogeneous, resulting in the appearance of microscopically inhomogeneous electric fields, wherein microscopic regions with the greater electric permittivity move toward the stronger field and those with smaller values move in the opposite direction. He connects this effect with fluctuations in density, in the microregions. This effect is microregional in extent, momentary only, or "fluctuating"; it is not a process for separating fluid mixtures into their constituents. It is a well-known process for measuring the electrical properties of a fluid under the influence of an applied electric field. It is brought about with a "strong" d.c. field that is uniform, and of very short duration.

The present invention provides for setting up a field with a gradient in the direction of species-separation. It uses a monotonic non-uniform field. It can be practiced using various prior-art means to establish a non-uniform field. A convenient way to establish a non-uniform electric field is with curved electrodes, such as a cylindrical electrode enclosing a wire or a smaller coaxial cylinder or tube as a second electrode. With this arrangement, the field gradient is radial, and when used according to the present invention this arrangement produces a radial species-concentration gradient. Matrices may be employed as described by Lin and Benguigui, ibid, to provide a non-uniform field. Referring to FIG. 4 of that paper, the electric field in a region between a surface of a dielectric fiber of the matrix and the bulk fluid remote from that surface is higher at the surface and lower in the remote bulk fluid; that is, in each such region there is a non-uniform electric field which, monotonically, is higher at the boundary surface of a dielectric fiber and gradually becomes lower as a function of distance away from that surface proceeding into the bulk fluid. Preferably, according to the present invention, the matrix is configured to produce gradients in at least some of said non-uniform fields which are substantially parallel to the direction of fluid flow so as to enhance its utility.

In one preferred embodiment of the invention flat electrodes are used with a dielectric spacer between them, the spacer having a variation in cross-section or dielectric constant or, if desired, both such that from one electrode to the other there exists a continuous gradient of the product of dielectric constant and cross-sectional area parallel to the electrodes.

The description following of exemplary embodiments of the invention refers to the accompanying drawings, in which:

FIG. 1 schematically illustrates a multi-stage embodiment of the invention;

Figure 4:
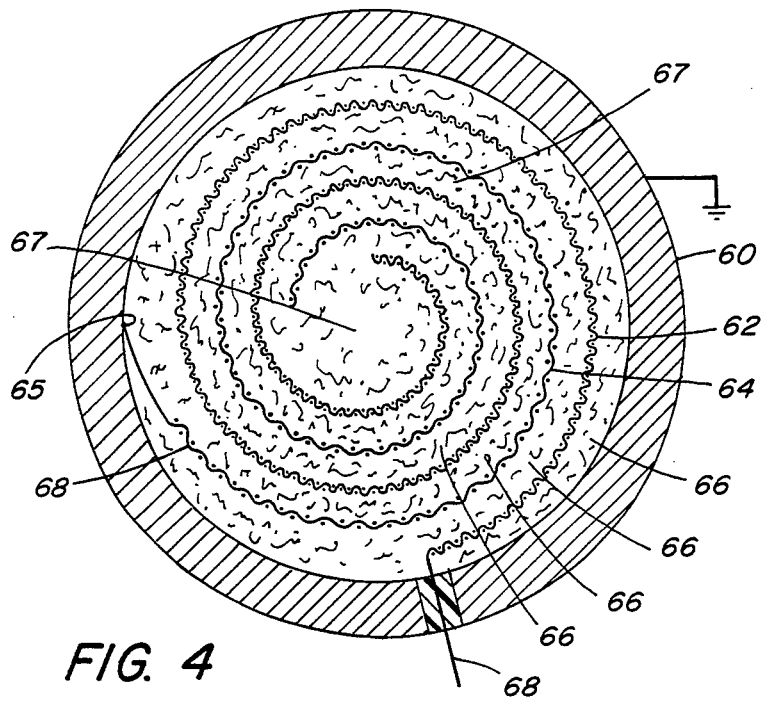
Figure 5:
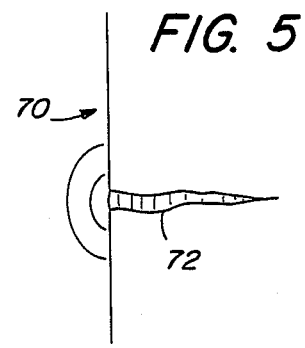
Figure 7:
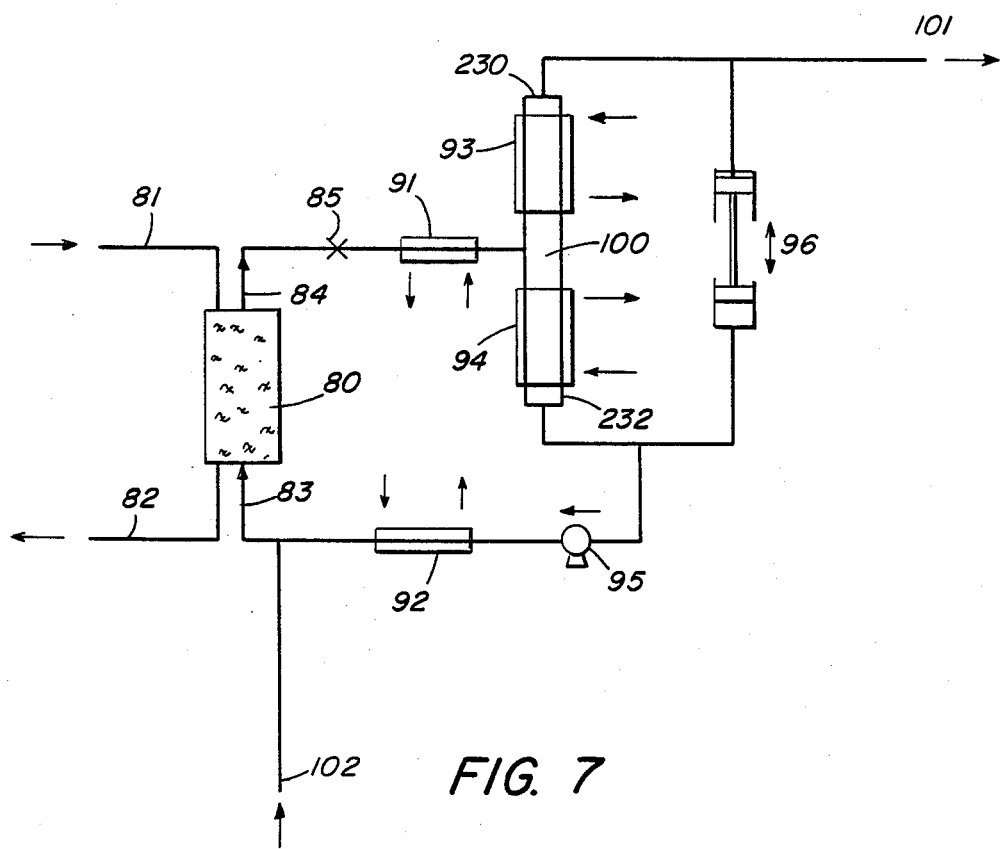
Figure 6:
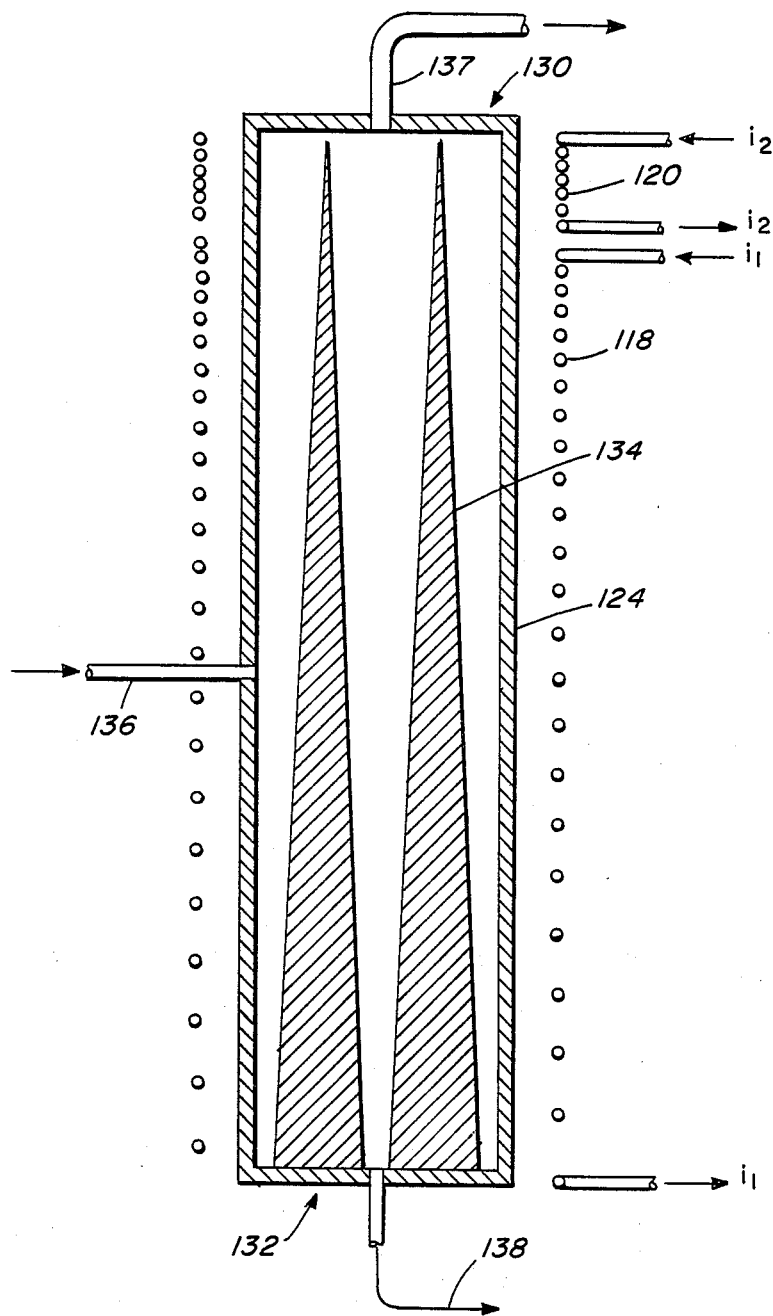

FIG. 4 schematically illustrates another embodiment of the invention suitable for use to extract dissolved $SiO_2$ from superheated steam without a phase change;

FIG. 5 illustrates an application of the invention to heal a crack in an article;

FIG. 6 schematically illustrates an open gradient embodiment employing a magnetic field; and FIG. 7 illustrates the incorporation of a separator of the present invention in a process to extract and recover a soluble species from a material substrate.

Figure 1:
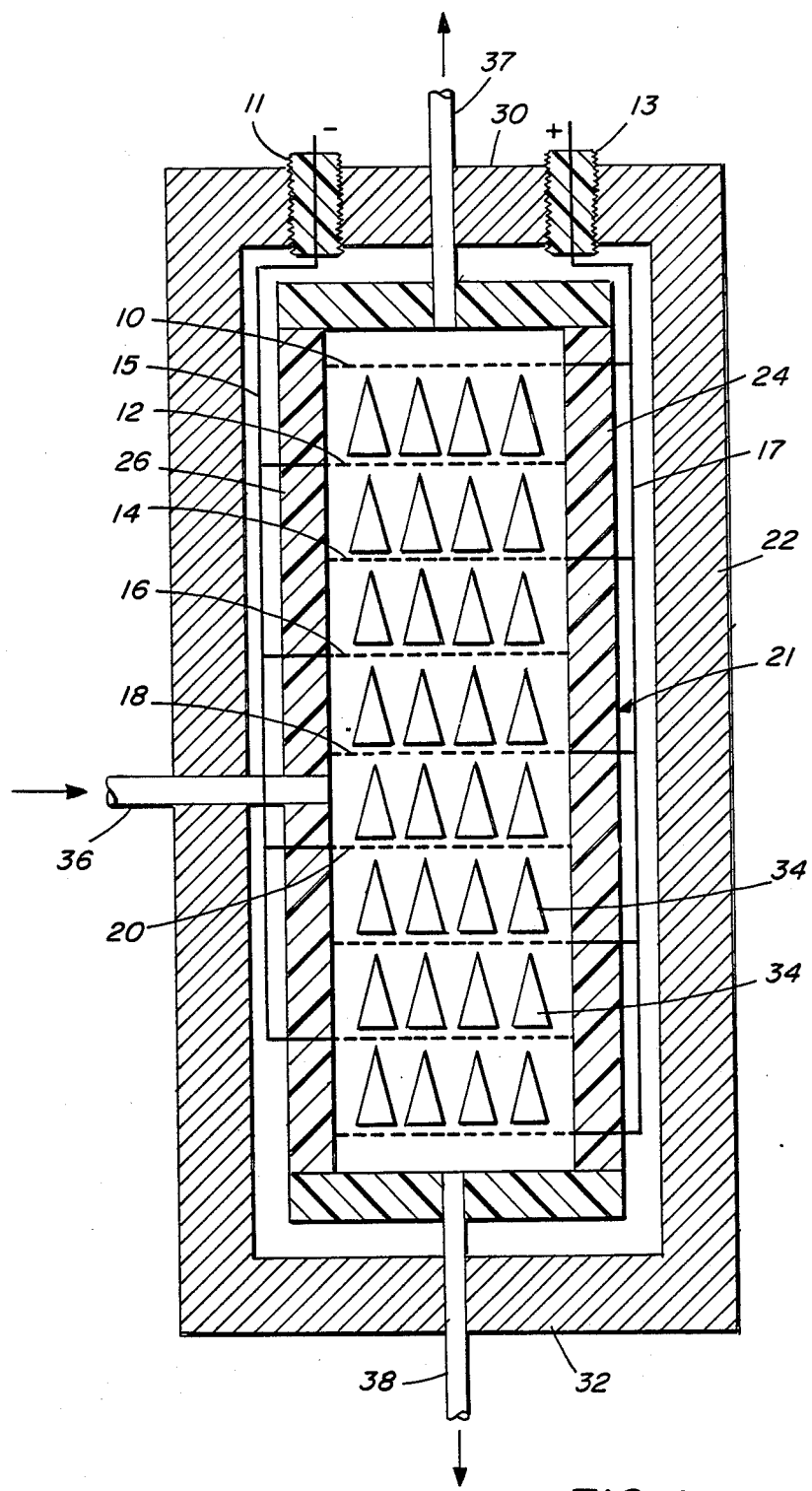
Figure 2:
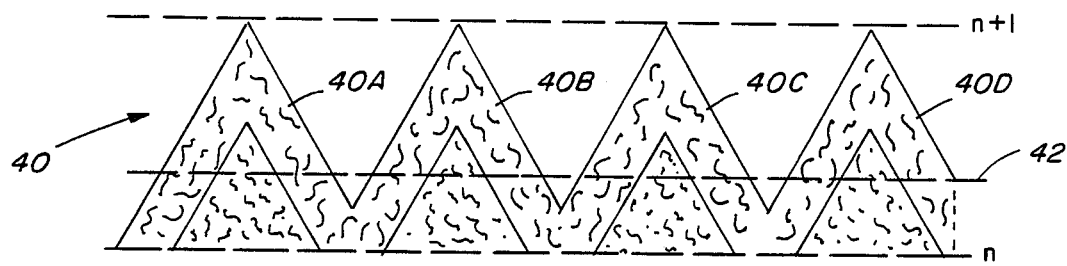
FIG. 2 shows a dielectric spacer suitable for use in FIG. 1.

In FIG. 1 a series of flat electrodes 10, 12, 14, 16, 18, 20, alternately polarized (+) and (−) as shown, are enclosed within opposite walls 24, 26 of an electrically non-conductive support 21, within a container 22 suitable for containing a near-critical fluid. The container 22 is open at its upper end 30 and its lower end 32 (as seen in the figure), for on-going coupling into a system making use of the invention. The electrodes are open, or perforated, so that fluids can pass through them; foraminous sheets, screens or the like can be used as electrodes. Preferably, the electrodes are thin. Between each pair of adjacent electrodes 10-12, 12-14, 14-16, 16-18 and 18-20 is a set of dielectric spacers 34. As shown, each spacer has a cross-section which is monotonically reduced so as to present a continuous cross-sectional gradient from one electrode to the other. This gradient is in the same direction for all the spacers 34, without regard to the direction of electric polarity between the electrodes of each pair, which direction is reversed from one electrode pair to the next. The spacers may be pyramidal in shape, or triangular-shaped sheets of dielectric material (eg: as shown in FIG. 2). In all cases the change in cross-sectional area of each spacer is monotonic between the electrodes. The dielectric constant of each spacer can also be reduced toward the thinner end of each spacer. As has been mentioned, the dielectric constant can be monotonically varied between electrodes without changing the cross-sectional dimension of the spacers. The essential requirement is that there be a continuous gradient of the product of dielectric constant and cross-sectional area parallel to the electrodes going from one electrode to the other. In all cases, the spacers 34 do not cover an entire electrode.

The container 22 has as opening at one side, intermediate the ends, for an input-port 36 through which to introduce feed fluid, an opening at its top 30 for a first output part 37 through which to remove treated fluid, and another opening at its bottom 32 for a second output port 38 through which to remove treated fluid. The output ports 37 and 38 are useful for coupling the FIG. 1 embodiment into a system making use of the invention.

Electrical couplings 11 and 13, here shown supported in and passing through the top 30 are used to apply voltage to the field electrodes. The first coupling 11 is connected via a wire 15 to alternate electrodes 12, 16 and 20, and the second coupling 13 is connected via a wire 17 to the intervening electrodes 10, 14 and 18. In the illustration, the first coupling 11 is (−), and the second coupling 13 is (+), this being by way of example only. If desired, additional couplings may be provided, so that, for example, the top two electrodes 10 and 12 may be independently controlled.

With the arrangement shown in FIG. 1, assuming the dielectric spacer 34 has a dielectric constant greater than the near critical fluid, the high field end of the structure is at the upper end 30, and the low field end is at the lower end 32. Because in dielectrophoresis the motive force depends on the gradient of $E^2$ the direction (or sign) of the electric field is not, relevant, so that the electrode-spacer assemblies can be stacked with the electrode polarities alternating, as is shown in FIG. 1. Arbitrarily, many stages can be put in series. There is a discontinuity at each electrode, but if the electrode is thin and open the performance of the assembly is not adversely affected. Feed fluid (not shown) may be introduced via the input port 36. The dielectric constant of the spacers 34 may be chosen to be higher or lower than that of the feed fluid.

FIG. 2 illustrates a dielectric spacer 40 made of pieces of paper or other porous material, between two electrodes labeled "n" and "n+1", respectively. After being cut on one edge into the zig-zag shape shown, additional triangles of paper are stitched along a line 42, for attachment. This provides a series of tapered elements 40A, B, C and D having a monotonic change of cross-sectional area from one electrode to the other. Paper is porous, and within the paper where the cellulose fibers of which it is made cross and approach each other smaller non-uniform field regions are formed, as is described above with reference to the matrixes described by Lin et al.

The following example describes a separation of silicone oil from $CO_2$ which was performed in a separator according to FIG. 1 using paper dielectric spacers as shown in FIG. 2.

EXAMPLE I

A mixture of $CO_2$ and silicone oil was fed into port 36. The spacing between electrodes was ¼ inch, and the field voltage was unfiltered ±8 KV between electrode pairs. With the field on, gas was drawn out of each end 30, 32 at equal rates; the flow rate of $CO_2$ out of each end of the separator was about 2.7 standard liters per minute. After 100 minutes slightly less silicone oil had been collected from the high-field end 30 than from the low-field end 32. The field was then shut off, and in the first 10 standard liters from the low-field end ten times more silicone oil was collected than in the previous 270 liters. These results are shown in Table 1, following. These results indicate that the field concentrated the silicone oil in the $CO_2$, and at the high-field end of the separator the field between the last electrode 10 and the outer grounded pressure vessel 22 was sufficient to retain the silicone oil. Moreover, the high-field regions formed where the electric field leaves the high dielectric constant cellulose fibers of the paper matrix (K≈3.5) and enters the fluid $CO_2$ (K≈1.5) concentrated silicone oil in the paper matrix. The result was an increase in silicone oil from the low-field end 32 when the field was turned off.

TABLE 1

| Gas Flow Stand Liters | Field | Wgt.(g) Silicone oil collected | |
|---|---|---|---|
| | | High field end 30 | Low field end 32 |
| 270 | on | .35 | .49 |
| 20 | on | not measured | not measured |
| 10 | off | 0.06 | 5.52 |
| 60 | off | 0.54 | 1.25 |
| 50 | off | 0.15 | 0.24 |
| 50 | off | 0.11 | 0.13 |
| 150 | off | 0.03 | 0.12 |

This example demonstrates the utility of the invention for open gradient separation, ie: to increase concentration of the solute at one end, and high-gradient separation, i.e.: the trapping of a component by a porous dielectric matrix within an applied field. Also observed is that if provision is made for turning off the field at the end-most high field electrodes 10 and 12 the trapped solute material will be allowed to pass out of the separator.

Figure 3A:
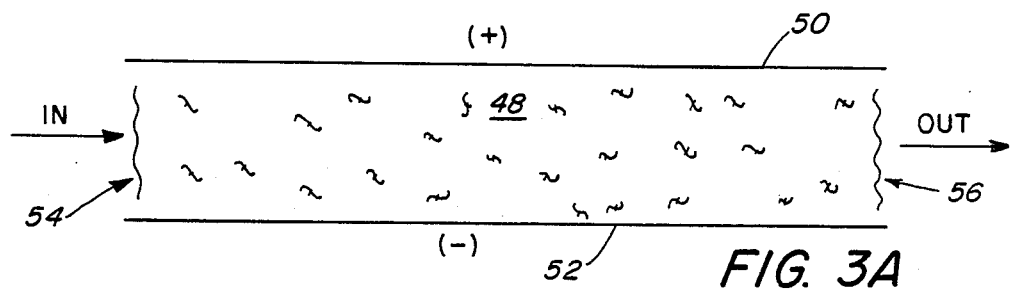
FIG. 3A and 3B illustrate another embodiment of the invention which couples a periodic change in an equilibrium condition and a periodic change in flow direction to extract a solute from a solution without a phase change.
Figure 3B:
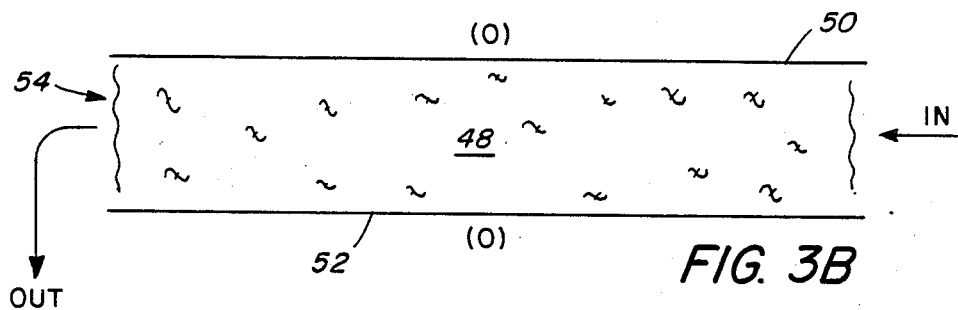

The embodiment next described employs the latter step to advantage. In FIG. 3 a bed of porous dielectric material 48 which may be generally like the dielectric matrix of FIG. 4 of Lin et al is placed between two electrodes 50, 52. A field is applied between the electrodes, as shown in FIG. 3A, and a solution to be concentrated is fed into one port 54, and out the other port 56. This step loads up the dielectric while the field is "on"; one component is trapped in the matrix, as has been described above. This trapping or retardation of said component is enhanced when the matrix is configured to produce gradients in at least some of the fields which are parallel to the direction of fluid flow. In the next step, the field is turned off, as shown in FIG. 3B, the flow is reversed, from port 56 to port 54, and the trapped material, now released by the matrix 48, is washed out of port 54. This method can be used to concentrate gaseous, liquid and solid components in a near-critical fluid. When removing the concentrated component from the matrix bed 48, near critical conditions need not be maintained. To remove the component in a more concentrated form it is sometimes desirable to increase the pressure, or more rarely decrease the temperature within the matrix, or even less often, add another solvent to assist in removing the trapped component from the matrix.

Under most circumstances the lower dielectric constant component is the majority material and is considered to be the solvent. An example would be hexane dissolved in $CO_2$. In some cases the majority material has a higher dielectric constant, and it is the solvent that concentrates in the high field regions. An example of this behavior is observed with a mixture of helium and carbon dioxide. In general the component with the lower critical temperature is the component that concentrates in the low field region for electric field systems. The invention may be practiced near the critical point of any component, or near the critical point of the mixture, along the critical locus, wherever the fluid mixture exhibits the near critical property of an increase in polarizability on application of a field.

The present invention has been disclosed as a means for separation of dissolved species in a single phase near critical mixture. Dielectrophoretic phase separation is very effective at separating two phases, and is well known as for example for removing water droplets from oil. The present invention can be practiced with a two phase mixture, where it acts upon single phase regions to cause component enrichment. One preferred embodiment of the present invention is to provide sufficient enrichment such that a two phase region is formed within the separator; this two phase region is brought about by changes in concentration brought about by the present invention and not by temperature or pressure changes as in the prior art of Zosel, ibid.

FIG. 3 is an illustration of a general class of embodiments of the invention. Dielectrophoretic versions use a packing of a dielectric material in an electric field to produce a non-oriented distribution of high-gradient regions. Near critical fluid containing a solute is fed into such a bed with field "on", the high-gradient regions progressively trap out the high-dielectric constant component of the mixture, which stays behind while the lower dielectric constant component proceeds through the bed and is progressively concentrated. Then the field is turned "off", the direction of flow is reversed, and the high-dielectric constant component of the mixture passes out of the bed with the reversed flow. Periodic repetition of this process leads to high levels of separation. A similar procedure is applicable to high gradient magnetic separation versions of this embodiment.

Different components dissolved in a near critical fluid are retarded to different extents by the fields within the matrix. Using a long flow path through a matrix allows this differential retardation to build up to a sufficient axial spacial separation so that when the field is turned off and the flow is reversed the two components can be separated from each other. This separation can be made between any species dissolved in a near critical fluid and is not limited to separations of majority and minority materials.

The procedure described above with reference to FIG. 3 uses the coupling of a periodic change in equilibrium conditions and a periodic change in flow direction to separate the components of a fluid which flows past the porous dielectric material 48. As such it adapts principles of parametric pumping, which is itself described in "Handbook of Separation Techniques for Chemical Engineers", McGraw-Hill 1979, Sec. 1.15, pages 1-467 to 1-485. The present invention is distinguished from the known prior art of parametric pumping in that it does not use an adsorbent. Further, where the prior art makes use of temperature differences, the present invention uses an electric (or magnetic) field difference, and seeks to avoid temperature changes, which consume far more energy than a change in electric (or magnetic) field intensity, and require longer cycle times because of the slowness of heat transfer when compared to the propagation of electric or magnetic fields. The energy used to generate the electric or magnetic field can be recovered when the field intensity is reduced, and can be used to reform the field on subsequent cycles.

The most commonly-encountered magnetic fluid is liquid molecular oxygen. Conventional separation of oxygen from the air involves distillation at cryogenic temperatures. A serious problem in that procedure is that hydrocarbons in the intake air end up as solids in the oxygen boiler, where detonations are a constant danger. Near the critical point in a strong magnetic field employed according to the present invention non-magnetic materials collect in regions of low magnetic field intensity, and only pure oxygen collects in the high field regions. Thus, according to the present invention light hydrocarbons can be separated from oxygen without having separate oxygen and hydrocarbon phases in contact. Moreover, the present invention, by doing the separation near the critical temperature of molecular oxygen requires less refrigeration than does separation near the boiling point of liquid oxygen.

The separator apparatus that is illustrated in FIG. 4 is suitable for removing silicon dioxide from super-critical steam before the steam is applied to drive a steam turbine. A tubular vessel 60, made for example of high-strength steel suitable for containing super-critical steam, is fitted with a high voltage electrode 62 and a "ground" electrode 64 spaced apart in a spiral-like form on an axis (not shown) paralleling the axis of the tubular vessel. The space 66 between the electrodes is filled with a bed or matrix 67 similar to the bed 48 in FIG. 3. The "ground" electrode is connected at 65 to the vessel 60. An electrode connector 68 to the high voltage electrode 62 is brought out through the vessel wall, for applying a high voltage to the high voltage electrode. The vessel 60 is, in use, fitted into a pipe (not shown) which brings super-critical steam to, e.g.: a steam turbine. Since steam has only a few parts per billion of silicon dioxide, the vessel 60 and its contents can be sized to last several years before it will have collected enough silicon dioxide to effectively fill up the matrix or bed 67 and so require that the matrix 67 be replaced. With the electric field constantly applied between the electrodes 62 and 64, solute ($SiO_2$) collects in high-field regions of the matrix 67 which thereby traps silicon dioxide out of the super-critical steam passing in the spaces 66 between the electrodes. The absence of parametric pumping components simplifies the installation, and allows uninterrupted operation of the turbine drive system in which the solute concentrator is installed. The concentrator will desirably be made in a size suitable to operate continuously throughout the time period between normal shut-downs of the systems. The addition of parametric pumping components may be desirable because it would reduce the size of equipment needed, and would reduce the inventory of $SiO_2$ present that could recontaminate the steam passing through the trapping matrix if the power supply momentarily failed.

Referring now to FIG. 5, the invention is useful to "heal" cracks in solid materials. A body 70, for example, a ceramic part which has a flaw or a crack 72 in it, is placed in a near-critical fluid (not shown), for example, super critical water in which the ceramic material is slightly soluble. A non-uniform field (not shown) is applied. A high-field region occurs in the crack. Solute ceramic is trapped in the crack. The electric field is maintained until the crack is filled.

FIG. 6 schematically shows an open gradient magnetic embodiment of the invention. The fluid is contained within a vessel 124, made of a material that does not adversely affect the magnetic field distribution and is compatible with the fluid being processed, such as a copper alloy. The separation magnetic field is produced by two coils 118 and 120. The larger coil 118 produces the main separation field. Its turns are non-uniformly spaced along the container 124. The non-uniform spacing of the turns carrying the current $i_1$, in coil 118 leads to a non-uniform magnetic field, with the higher intensity field region being where the turns are more closely spaced. The high field region is thus near the upper end 130 (as seen in the drawing), the low field region being at the lower end 132. The magnetic field is produced with two coils, the main separation coil 118, and a second auxiliary coil 120 that is used as a means for removing high permeability material from the high field end without shutting down the main separation field. This is done by changing the current $i_2$ flowing through the second coil 120 in amount and sense to reduce the local magnetic field to zero at the high field end 130, so as not to exert a magnetic force on the higher permeability material when removing it from vessel 124. In operation the current $i_2$ in the auxiliary coil is periodically changed to reduce the field, and during that time the fluid that has been enriched in that region is withdrawn. The use of an auxiliary coil 120 allows the main coil 118 to be operated continuously. This arrangement allows the main separating field to be supplied in other ways; as by a superconducting magnet, or alternatively permanent magnets (not shown) could be used to generate the non-uniform main separating magnetic field.

FIG. 6 also illustrates the use of a magnetically permeable spacer 134 analogous to the dielectric spacer 34 in FIG. 1. This is shown with a narrow cross section at the high field end (130) and a wide cross section at the low field end (132). The spacer 134 can be made of any material with a magnetic permeability sufficiently different and preferably higher than the fluid being processed, such as iron alloys or compounds.

When the present invention is used to process molecular oxygen special precautions must be taken as to materials of construction used. For example, steel wool would make a very good magnetic matrix, except that there would be a large danger of explosion or fire. A safer material would be a magnetic iron oxide or ceramic.

FIG. 7 illustrates the incorporation of the present invention in a process to extract and recover a soluble species from a material substrate.

The material substrate is introduced through line 81 into extraction vessel 80 where the material is contacted with a solvent entering through line 83. The extracted material depleted in dissolved species is removed through line 82. The solvent containing those dissolved species exits through line 84. The solution is then acted upon to form a near critical mixture. This may be done by changing the pressure as with a throttle valve 85, or the temperature using a heat exchanger 91. The near critical fluid then enters a separation device 100 according to the present invention where the solute is concentrated toward the low field end 230 at the top of the vessel. The solvent is concentrated at the high field end 232 and is shown being recycled through pump 95 and heat exchanger 92 to line 83, to restore the solvent to the conditions used for extraction in vessel 80.

Also illustrated as parts of the separation device 100 are two heat exchangers 94 and 93, which are used to maintain the fluid within the separator 100 at near-critical conditions as the composition of the mixture changes. A double ended pump 96 is connected across the separation device 100 to allow operation of separator 100 in a parametric pumping mode. Such a pump or equivalent device is necessary when using a high gradient matrix type separator as in FIG. 3 or FIG. 4, and can improve the effectiveness of a separator as illustrated in FIG. 1 or FIG. 6. When the pump 96 is used means must be provided (not shown) for periodically changing the field within the separator 100 in phase with the pulsatile flow of fluid induced by pump 96. The dissolved species are removed through output line 101 and make up solvent is introduced through make-up line 102. For example, fish oil can be recovered from fish meal using the apparatus of FIG. 7. The meal is introduced through line 81 into extraction vessel 80 where it is contacted with high pressure propane introduced through line 83. The propane and the propane soluble species pass out through line 84 and through throttle valve 85 and heat exchanger 91 which are used to adjust the pressure and temperature so that near critical conditions are obtained in separator 100. The fish oil is concentrated and removed through line 101. The propane solvent is purified and recycled through pump 95 to vessel 80 where additional extraction occurs. The oil depleated fish meal is recovered through line 82. The material extracted from fish meal is a complex mixture of various oils, vitamins, odoriferous compounds and often undesirable fat soluble compounds such as PCB's, cholesterol, DDT, and organometalic compounds. In a matrix type separator as in FIG. 3 or 4 each component of the mixture is retarded to a different degree. By using a multiplicity of separators of the present invention (not shown) the near critical mixture can be divided into a multiplicity of fractions each with a different composition.

Carbon dioxide is extensively used in enhanced oil recovery. For most effective use of this $CO_2$ it is desirable to purify it before injection or reinjection into an oil field. The conventional method is one of the forms of distillation. The present invention can be used at higher pressure and temperature while maintaining a single phase. Impurities that can be advantageously removed with the present invention are $H_2S$, $N_2$, $O_2$, $CH_4$, He, $C_2H_6$, $C_3H_8$, heavier hydrocarbons, non condensible gasses and other soluble species.

Another application of the invention is in the detoxification of solids, soils, waste fluids, activated carbon, dredge spoils or other materials. Processes to use SCF to extract contaminants have been proposed and are well known. The disadvantage of heretofore proposed processes is the energy required to change the pressure or temperature, precipitate and isolate the contaminant and recycle the fluid. The present invention allows purification of the solvent without a pressure or temperature change and allows a soil decontamination process to be practiced more economically.

Another application of the invention is in the processing of natural gas, $CH_4$. As natural gas is recovered from underground formations it often contains impurities that are advantageously removed. Some such as $H_2S$, $N_2$, $CO_2$ are removed because their presence is undesirable, and some such as natural gas liquids, $C_2H_6$, $C_3H_8$ and higher hydrocarbons, and helium are recovered because they are more valuable than the methane. The present invention offers an alternative to the cryogenic distillation and adsorption processes that are currently practiced.

Super-critical fluids have very low viscosities, yet remain goods solvents for some species. For this reason they are used as solvents in super-critical fluid chromatography. The present invention is well suited to analytical separations, because it can be used incorporating a very large number of theoretical equilibrium stages, and because the applied field can be controlled easily and accurately.

Chromatographic separations are based on the counter current flow of a mobile phase and a stationary phase. The present invention uses the counter current flow of two mobile phases. The present invention is well suited to performing difficult separations, and unlike chromatography can be scaled to process large quantities continuously. The present invention is useful in the separation of mixtures of isomers, and of compounds with differing isotopic composition. By using an arbitrarily long separator of the type shown in FIG. 3 or FIG. 4, even very small differences in retardation of mixture components by the fields within the matrix can lead to an arbitrarily large separation when the fluid path through the matrix is very long.

I claim:

1. The method of treating a fluid solution comprising applying a non-uniform field to said solution while maintaining said solution under near critical conditions of temperature and pressure, and with said field deflecting one of the components of said solution to a greater extent than other components of said solution.

2. The method of treating a mixture of electrically neutral materials comprising, forming a solution of said materials under near-critical conditions of temperature and pressure, and applying to said solution a non-uniform field so as to deflect one of the components of said mixture to a greater extent than other components of said mixture.

3. The method of treating a mixture of electrically neutral, materials having different dielectric constants comprising forming a solution of said materials under near-critical conditions of temperature and pressure, and applying to said solution a non-uniform electric field to dielectrophoretically separate said materials.

4. The method of treating a near critical fluid mixture comprising applying a non-uniform electric field to said mixture to dielectrophoretically separate single-phase solution components of said near critical fluid mixture.

5. The method of treating a near critical magnetic or diamagnetic fluid mixture comprising applying a non-uniform magnetic field to said mixture to magnetically separate single-phase solution components of said near critical fluid mixture.

6. Method according to claim 5 comprising providing said magnetic field in two components, and periodically varying one of said components while maintaining the other of said components in a substantially steady state.

7. The method of treating a near critical single-phase fluid mixture comprising providing a porous polarizable matrix, leading said fluid mixture to flow through said matrix, subjecting said matrix to a field of an intensity such as to produce non-uniform fields within the interstices of said matrix, with said intersticial fields effecting in a said matrix a retardation of one of the components of said near critical single-phase fluid mixture and permitting a portion of said fluid mixture to pass through said matrix depleted of said retarded component.

8. The method of claim 7 including the subsequent steps of reducing the intensity of said field so as to reduce said retardation of said one component in said matrix, and recovering from said matrix a portion of said single-phase fluid mixture enriched in said on component.

9. The method of claim 8 including the step of reversing the direction of flow of said fluid mixture through said matrix when said field intensity is reduced, so as to recover said portion out of the reversed flow of said fluid mixture from said matrix.

10. The method of claim 9 wherein the direction of said flow and said intensity of said field are both changed cyclically substantially simultaneously, so as to effect a substantially continuous periodic recovery of said portion of said fluid mixture enriched in said component and said portion of said fluid mixture depleted in said component.

11. The method of claim 7 wherein said porous matrix is configured so as to produce gradients in some of said non-uniform fields substantially parallel to the direction of flow so as to enhance said retardation of said component.

12. Method according to any of claims 7 to 11, inclusive wherein the matrix is subjected to an electric field.

13. Method according to any of claims 7 to 11, inclusive, wherein the matrix is subjected to a magnetic field.

14. The method of claim 1 wherein at least one of said deflected fluid solution components is removed from the influence of said field.

15. The process of recovering soluble species from a material substrate comprising, contacting a material substrate containing said soluble species with a fluid solvent effective to dissolve said soluble species from said material substrate, acting upon the resultant fluid mixture of said soluble species in said fluid solvent so as to form it into a near critical single-phase fluid mixture, applying a non-uniform field to said near-critical fluid mixture so as to recover said fluid solvent and said soluble species separately from the residue of said material substrate depleted of said soluble species.

16. The process of claim 15 including the steps of recovering said fluid solvent from said near critical fluid mixture, and recycling said solvent for repeated contacting with said material substrate.

17. The process of removing dissolved material from superheated steam being fed to a steam-receiving device, comprising the steps of passing said steam through a non-uniform electric field while maintaining said steam under near critical conditions of temperature and pressure so as to hold said material dissolved in a single-phase steam solution, and with said field deflecting said dissolved material component of said solution from passage to said steam receiving device, whereby said steam reaching said device is depleted of said material.

18. The process of claim 17 including trapping said deflected material in a residence space within said field, and reversing the flow of said steam through said space to remove said trapped material from the path of said steam to said steam-receiving device.

19. Method of solute specie enrichment in a near critical fluid comprising the steps of providing said fluid having said specie dissolved in it under near-critical conditions of temperature and pressure, while maintaining said conditions applying to said fluid a substantially monotonic non-uniform field of strength adequate to effect a motive force on said specie in said fluid so as to cause a first region of said fluid to becomes enriched in said solute specie and a second region of said fluid to become depleted of said solute specie, and maintaining said near critical conditions and said field so as to enhance the enrichment of said solute specie in said first region.

20. Method according to claim 19 comprising continuing to maintain said conditions and to apply said field, so that said enrichment of said first region is continued until said solute species enrichment exceeds the solubility limit of said first region of said fluid under said near-critical conditions and said solute is precipitated out of said first region in said near critical fluid.

21. Method according to claim 19 comprising placing in said fluid an article of solid material having a crack, flaw or other void in it, wherein said solute specie is caused to precipitate in said void so as to improve one or more of the physical properties of said article.

22. Method according to claim 21 wherein the material of said article includes the same material as said solute specie.

23. A method of separating two materials one from the other comprising the steps of providing a mixture of said materials dissolved in a fluid mixture under near-critical conditions of temperature and pressure, and passing said fluid mixture through a non-uniform field of strength adequate to effect a differential motive force on said materials such that one of said materials is enriched in one portion of said fluid mixture and depleted from another portion of said fluid mixture in said field.

24. A method according to claim 23 comprising the additional step of trapping said solute in said enriched portion, and reducing said field so as to release said trapped solute for recovery.

25. A method of treating a mixture of solution components in a near critical fluid in a non-uniform field according to any of claims 1, 4, 5, 6, 7, 8, 9, 10, 19, 21, 22, 23 or 24 wherein at least one of said components is chosen from the list of $CO_2$, $CH_4$, $C_2H_6$, $C_2H_4$, $C_2H_2$, $C_3H_6$, $C_3H_8$, $C_4H_{10}$, $C_5H_{12}$, He, $N_2$, $N_2O$, $C_6H_6$, $C_7H_8$, $CClF_3$, $CCl_2F_2$, $CCl_3F$, $N_2O_4$, $NH_3$, $H_2O$, $H_2S$, $SO_2$, $CF_4$, $CHF_3$, $H_2$, $C_8H_{10}$, $CH_3OH$, $C_2H_5OH$, $O_2$, Xe, $SiO_2$, NaCl, HCl, HF, Ar, Kr, $C_6H_{12}$, $C_6H_{14}$.

26. Apparatus for enriching a solute specie in a near-critical fluid comprising, a container for said fluid, said container being adapted to provide near-critical conditions of temperature and pressure for said fluid, means to introduce said fluid having said solute specie mixed in it into said container, means to establish and to maintain said conditions in said container, and means to apply to said fluid a substantially non-uniform field of strength adequate to effect a motive force on said solute specie in said fluid so as to cause a first region of said fluid in said container to become enriched in said solute specie relative to other regions in said fluid in said container.

27. Apparatus according to claim 26 including passive means within said container to provide one or more regions of non-uniform field in response to the application of a field establishing force.

28. Apparatus according to claim 27 including at least two electrodes for establishing an electric field in said container, said passive means being located between said electrodes, and exhibiting a continuous gradient of the product of its dielectric constant and cross-sectional area from one electrode to the other.

29. Apparatus according to claim 27 including at least two electrodes for establishing an electric field in said container, said passive means being a matrix of dielectric fibers located between said electrodes.

30. Apparatus according to claim 26 or 27 including means to establish a non-uniform magnetic field within said container.

31. Method of claim 15 or claim 16 wherein the material substrate is chosen from the list of hazardous materials, lipid containing materials, polymer mixtures, petroleum containing mixtures, mixtures resulting from the refining of petroleum, mixtures resulting from fermentation, materials containing caffeine or theobromine, spices, coal, oil shale, tar sands, coffee, tea, oil seeds, hops.

32. Method of claim 15 or claim 16 wherein said soluble species recovered is chosen from the list of hydrocarbons, PCB's, chlorinated solvents, vegetable oils, animal fats, resins, waxes, alcohols, esters, odoriferous materials, silicones, caffeine, pesticides.

33. Any product of the method according to claim 15 or claim 16.

* * * * *